May 3, 1927.
E. H. BABEL ET AL
1,627,225
FOUR-WHEEL EQUALIZED TRACTION UNIT
Filed March 29, 1924      6 Sheets-Sheet 1
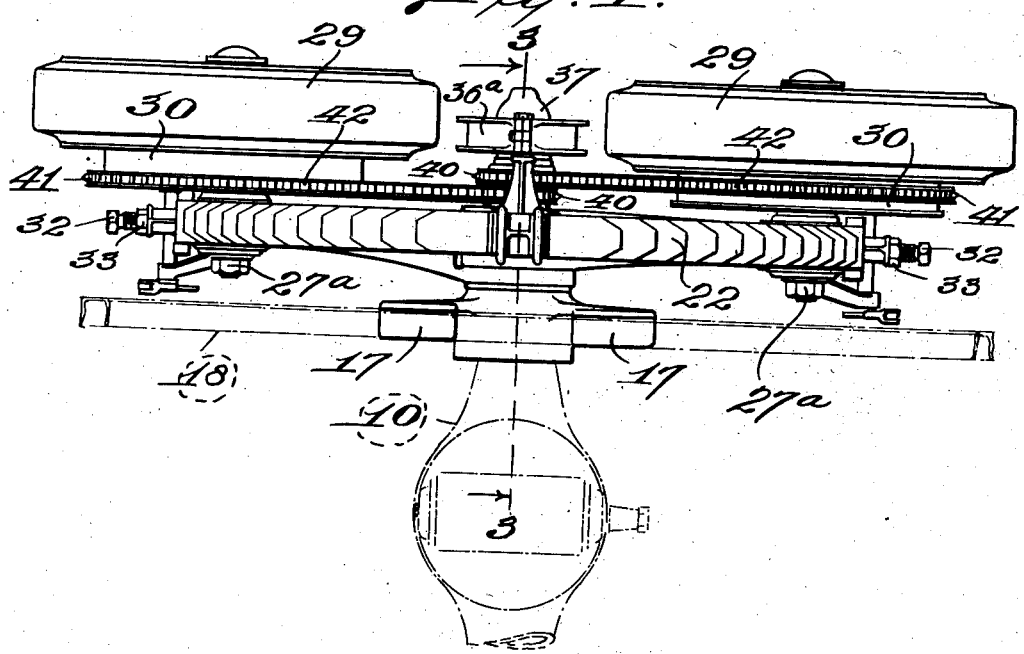
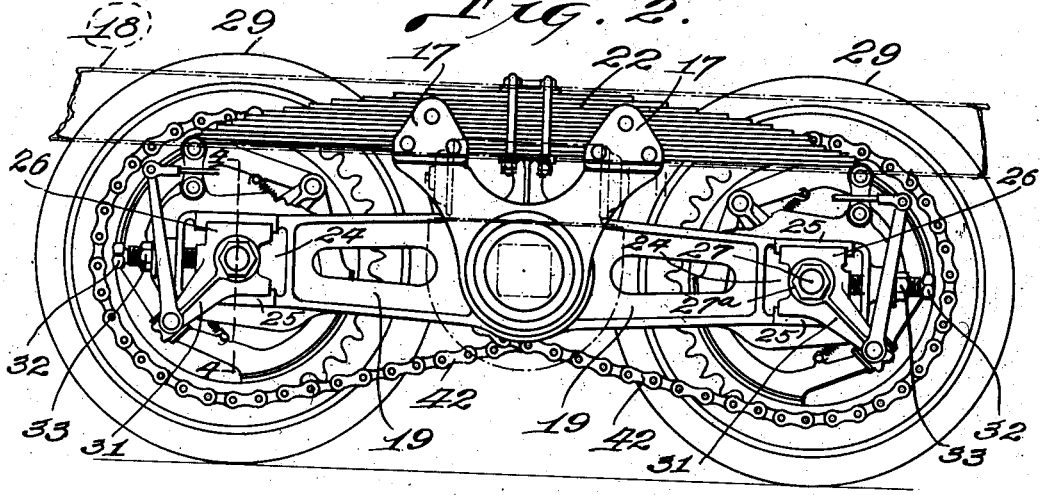
Elmer H. Babel and
Richard I. Owen INVENTORS,
BY
ATTORNEY.

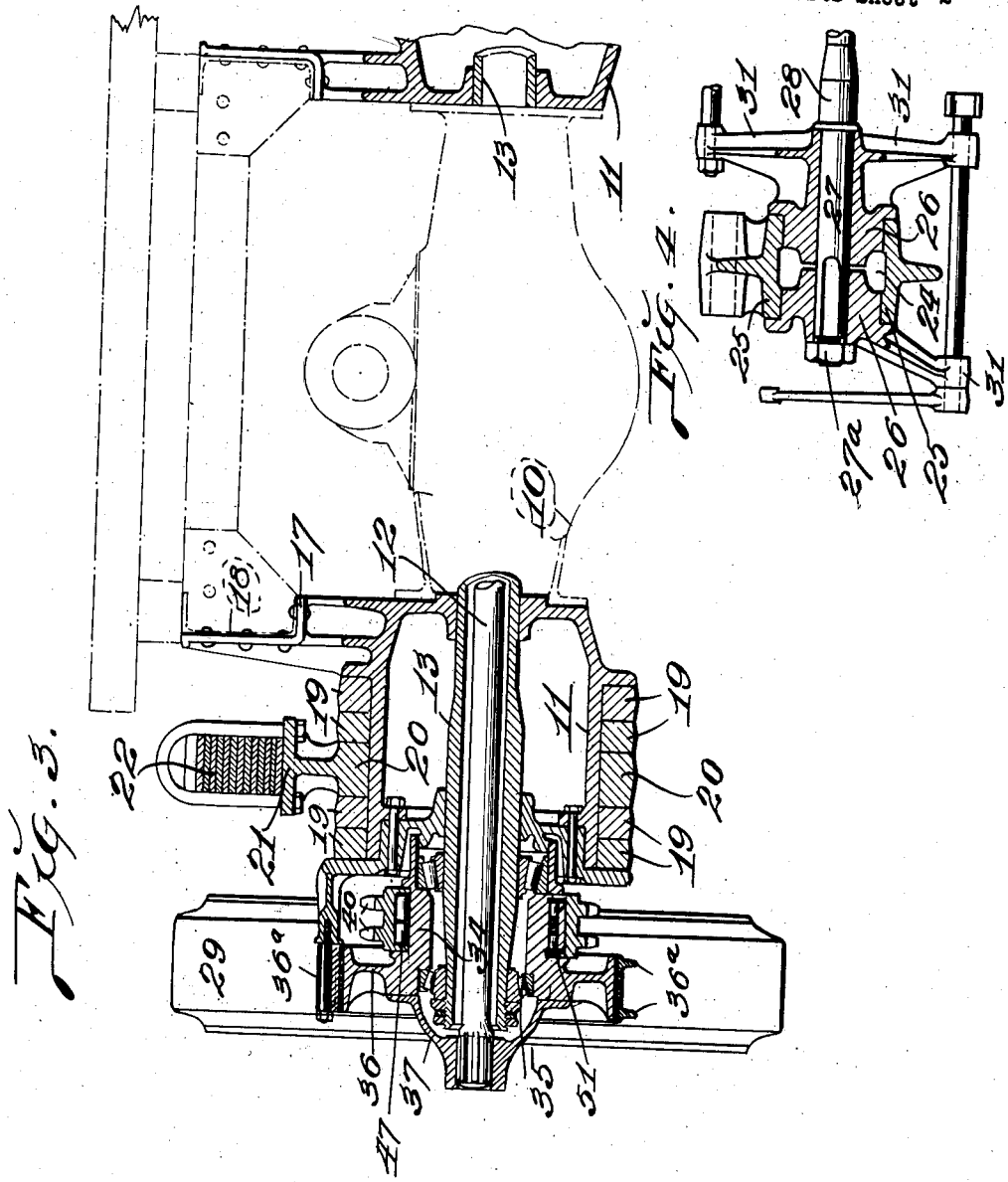

May 3, 1927.
E. H. BABEL ET AL
1,627,225
FOUR-WHEEL EQUALIZED TRACTION UNIT
Filed March 29, 1924    6 Sheets-Sheet 3
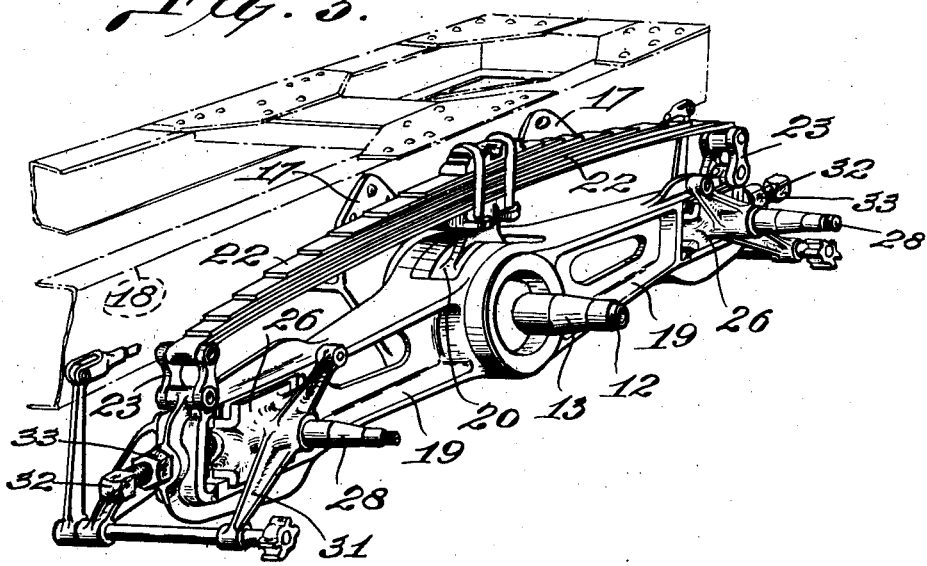
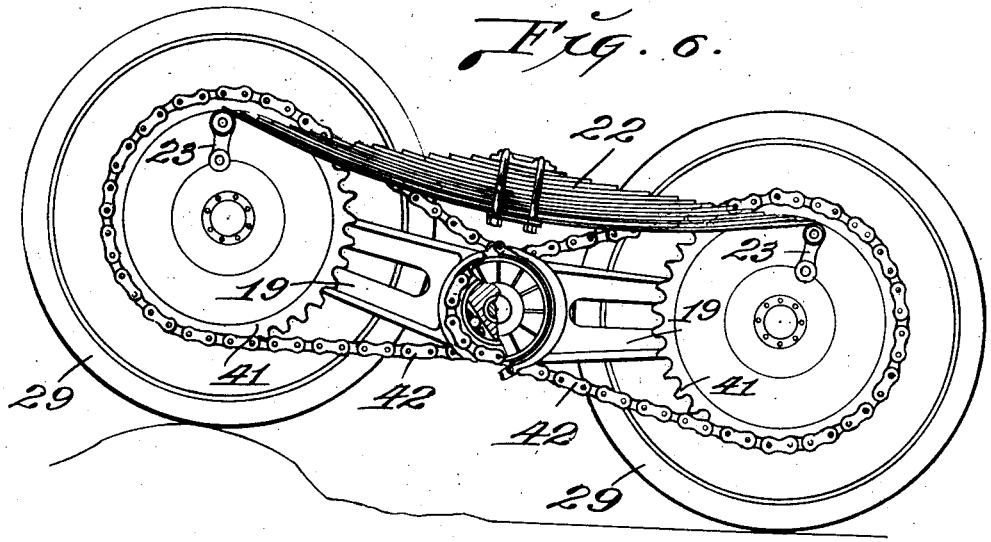
Elmer H. Babel and
Richard L. Owen INVENTORS,
BY
Martin P. Smith
ATTORNEY.

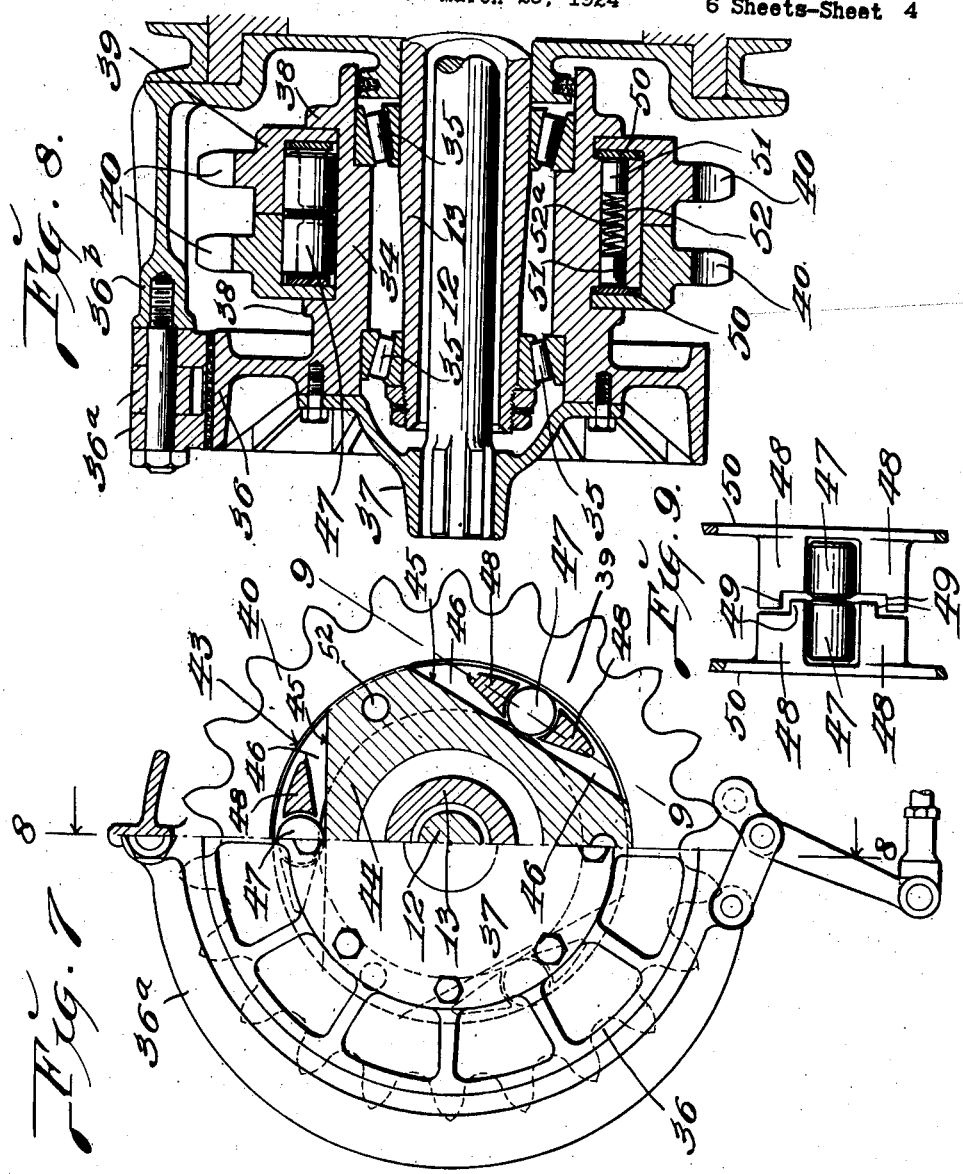

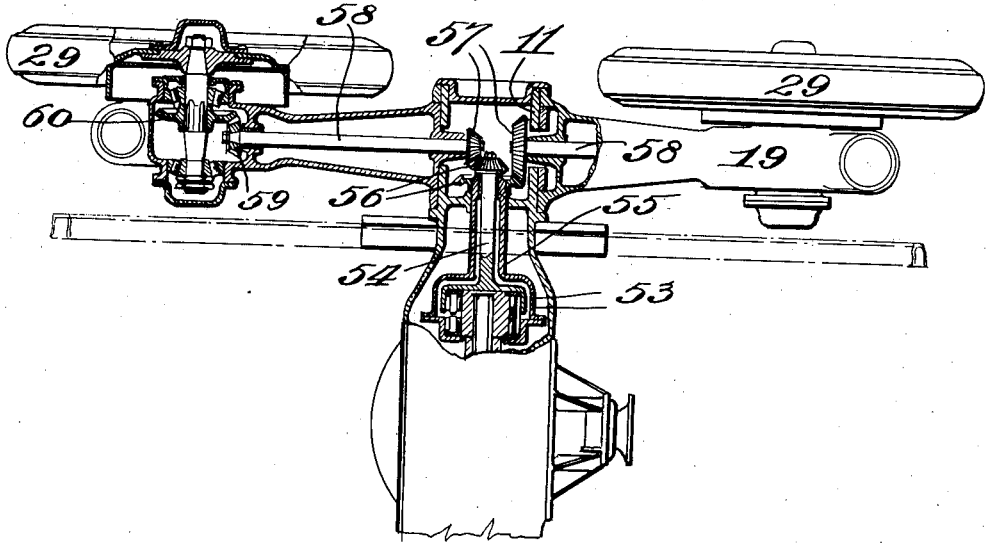
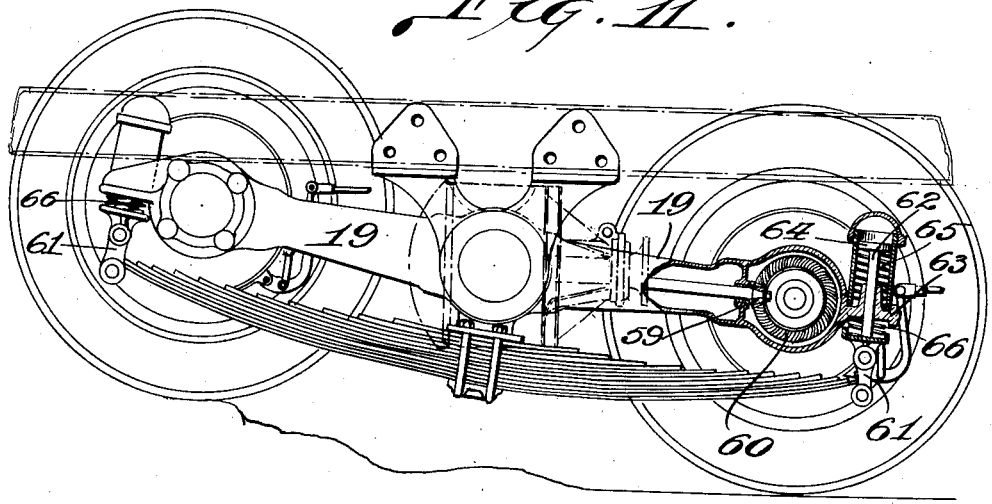

May 3, 1927.
E. H. BABEL ET AL
1,627,225
FOUR-WHEEL EQUALIZED TRACTION UNIT
Filed March 29, 1924     6 Sheets-Sheet 6
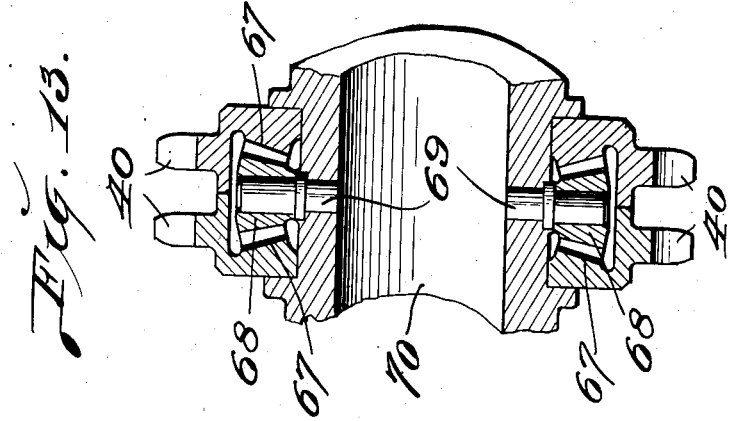
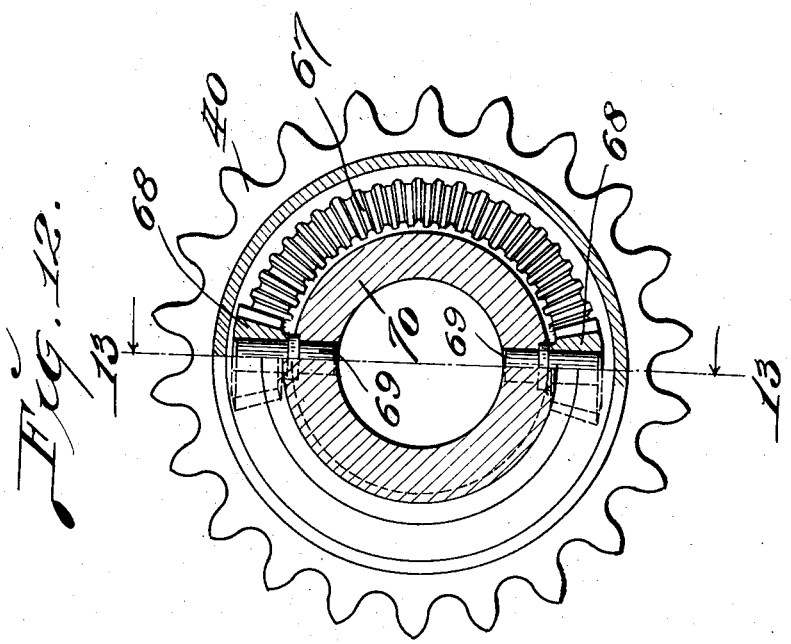
Elmer H. Babel and
Richard L. Owen    INVENTORS,
BY
Martin C. Smith
ATTORNEY.

Patented May 3, 1927.

1,627,225

UNITED STATES PATENT OFFICE.

ELMER H. BABEL, OF OAKLAND, AND RICHARD L. OWEN, OF VENICE, CALIFORNIA; SAID BABEL ASSIGNOR TO SAID OWEN.

FOUR-WHEEL EQUALIZED TRACTION UNIT.

Application filed March 29, 1924. Serial No. 702,938.

Our invention relates generally to vehicles, and more particularly to a four wheel equalized traction unit that is especially designed for use in driving motor vehicles and particularly those vehicles that are engaged in carrying relatively heavy loads, the principal objects of our invention being, to generally improve upon and simplify the construction of the existing forms of vehicle driving traction units; to provide a construction that will carry a much greater load than is ordinarily possible with the ordinary types of four wheeled trucks or load carrying vehicles; further to carry the relatively heavy loads with relatively lower depreciation and consequent cost per ton mile, and, further, to carry the relatively heavier loads with less wear and tear on the surface of the roadway or pavement, which desirable result is attained through lower unit tire pressure.

Further objects of our invention are to provide a vehicle driving traction unit of the character described that will be effective in reducing to a minimum the unsprung weight in the shape of the heavy axle that is necessary to the vehicle in carrying heavy loads; to provide a construction wherein each wheel is mounted so that it has true vertical action independently of the other wheels; to provide for the elimination of all torsional stresses in the springs that form a part of the unit; to provide for a straight line drive without the employment of universal joints and their attendant disadvantages; to provide means for producing equalized and independent driving effort for each wheel of the unit; to eliminate the difficulties and complexities ordinarily encountered in the endeavor to produce a low floor line for the vehicle; to provide a construction that is relatively simple yet strong and durable and readily accessible for the purposes of inspection, adjustment and repair, and further, to provide a traction unit, in which, standardization may be accomplished through the adoption and use of well known and readily obtainable parts, such as axles, brakes, hubs and springs.

The accomplishment of the objects above enumerated permits the production of a practical load carrying vehicle which, in operation, is effective in materially reducing highway deterioration that may result from overloading or high unit tire pressure, as well as the deterioration that results from excessive unsprung weight, which latter, in combination with even the fairly low speed of load carrying trucks, creates impact that is more or less destructive to the surface of the highway. Since this impact increases with the square of the speed at which the truck is driven, it will be readily understood that a truck making a return trip after having delivered a load imposes a smaller unit load on the highway, yet by virtue of this reduction in load the truck is enabled to proceed at a correspondingly greater speed with the attendant greater impact on the roadway surface.

With the foregoing and other objects in view, our invention consists in certain novel features of construction and arrangement of parts that will be hereinafter more fully described and claimed and illustrated in the accompanying drawings in which:

Fig. 1 is a top plan view of one side of our improved traction unit.

Fig. 2 is an elevational view looking against the inner face of one of the side members of the traction unit.

Fig. 3 is an enlarged cross section taken approximately on the line 3—3 of Fig. 1.

Fig. 4 is an enlarged detail section taken approximately on the line 4—4 of Fig. 2.

Fig. 5 is a perspective view of one side of our improved traction unit with the traction wheels removed.

Fig. 6 is a diagrammatic side elevational view showing the positions assumed by certain of the parts of the unit when one of the wheels thereof overides an abrupt raised portion of the roadway.

Fig. 7 is an enlarged elevational view of the end of the axle forming a part of the traction unit and showing the driving sprockets and the service brake.

Fig. 8 is a vertical section taken on the line 8—8 of Fig. 7.

Fig. 9 is a detail section taken on the line 9—9 of Fig. 7.

Fig. 10 is a plan view, with parts in horizontal section, of a modified form of the driving unit wherein gears and driving shafts are utilized as the driving means, instead of sprocket wheels and chains, Fig. 11 is a side elevational view with parts in section of the gear driven traction unit.

Fig. 12 is an elevational view partly in section, of a differential mechanism that may be used with our improved traction unit.

Fig. 13 is a cross section taken on the line 13—13 of Fig. 12.

Referring by numerals to the accompanying drawings, which illustrate a practical embodiment of our invention, 10 designates the main cross member of the traction unit, which is in the form of a combined axle and differential gear housing, the ends thereof being provided with horizontally disposed cylindrical trunnions 11 that may be formed integral with or fixed to the end portions of said member 10. The axle members 12 that are contained within housing 10 extend axially through and a substantial distance beyond the trunnions 11, said axle members carrying the usual sleeves 13. The cross member or axle used in our improved traction unit is preferably of a standard type that is readily obtainable in the open market.

Formed integral with or fixed to the inner portions of the trunnions 11 are upwardly projecting brackets 17 that serve as seats and points of attachment for the side members 18 of the vehicle frame. Mounted so as to rotate freely upon each trunnion 11 are the inner ends of a pair of spring arms 19, the same projecting horizontally in opposite directions from the trunnion. Mounted to rotate freely upon each trunnion between the inner ends of these spring arms is a spring supporting member 20 carrying at its upper end a seat 21 to which is secured the intermediate portion of a horizontally disposed leaf spring 22. The ends of this leaf spring are connected to the end portions of the respective spring arms 19 by means of suitable shackles 23. In some instances, it may be found desirable to dispense with these shackles and permit the ends of the spring to bear directly upon the ends of the spring arms or upon suitable bearings formed thereon.

The outer end of each spring arm is formed with a substantially rectangular opening 24, and those portions of the arm immediately above and below each opening serve as ways or bearing members 25 for a cross-head-like structure comprising blocks 26, the latter serving as a bearing for a short transversely disposed shaft 27; a portion of the latter being projected outwardly to form a stub axle 28 upon which is mounted a hub portion of a traction wheel 29.

These traction wheels are preferably of standard construction and provided on their inner faces with brake drums 30, in which are arranged for operation a standard form of expanding brake. These internal brakes may be actuated in any suitable manner, but preferably by a standard form of mechanism that is mounted on brackets 31 that project from suitable points on the blocks 26.

Screw seated in the outer end of each spring arm is an adjusting screw 32, the inner end thereof being connected to the blocks 24 so that when said screw is rotated said blocks will be simultaneously moved lengthwise of the ways 25. Arranged on the outer portion of each adjusting screw is a lock nut 33, which, when tightened, locks the screw 32 against movement in both directions.

The construction just described provides simple and efficient means for adjusting the stub axles 28 toward or away from the axis of trunnions 11, thereby taking up or producing the desired degree of slack in the sprocket chains utilized for driving the wheels 29.

Obviously this feature is not employed where the traction wheels are gear driven.

A nut 27ª, is screw seated on the outer end of the shaft 27 and, when tightened, cooperates with said shaft in drawing blocks 26 together to clamp the ways 25 and thereby lock said blocks in their adjusted position.

The traction wheel driving mechanism includes a hub member 34 that is mounted to rotate freely upon suitable anti-friction bearings 35 that surround sleeve 13, and formed integral with or fixed to the outer portion of said hub is an external or service brake drum 36. Secured in any suitable manner to the end of axle 12 that projects beyond sleeve 13 and bearing 35 is a hub cap 37 that is connected in any suitable manner to brake drum 36.

Encircling brake drum 30 is a standard form of contracting brake 36ª, the parts of which are anchored to a bracket 36ᵇ that projects outwardly from trunnion 11 or a part that is secured thereto, this brake being provided with suitable actuating mechanism.

Mounted for free independent rotary movement upon hub 34 between flanges 38 that are formed on said hub, are the widened inner or hub portions 39 of sprocket wheels 40, that are equal in size. In order to enable these sprocket wheels, to be assembled in position upon hub 34 between flanges 38, said sprocket wheels may be split or divided diametrically and the two parts of each wheel rigidly secured to each other after being positioned upon the hub. The brake drums 30 on the wheels 29 are each provided with an externally arranged row of sprocket teeth to form a sprocket wheel 41, and these last mentioned sprocket wheels are in alignment, respectively, with the sprocket wheels 40. Connecting the respective pairs of sprocket wheels 40 and 41 are sprocket driving chains 42.

The inner portions of the widened hubs 39 of the sprocket wheels 40 are recessed to form a common annular chamber 43 that receives an outwardly projecting portion 44 of the hub 34, and arcuate portions of this projecting hub member 44 are cut away to provide straight flat bearing surfaces 45. The chamber 46 that is formed by thus cutting away a portion of hub member 44 constitutes an elongated cage for a pair of rollers 47, there being one roller, or rather one set of rollers for each sprocket wheel, and one pair of rollers for each cage or chamber 46. Projecting from the inner faces of friction rings or plates 50 into the chamber 46 are pairs of lugs 48, the members of each pair being disposed on opposite sides of the corresponding roller 47, and the inner ends of these lugs 48 are provided with overlapping shoulders 49. The rollers 47 have a certain amount of play, or movement circumferentially of the sprocket hubs between the members of the respective pairs of lugs 48 and the overlapping shoulders 49 on the inner ends of said lugs are spaced a sufficient distance apart to permit the lugs on the plates or rings 50 to have a certain amount of independent circumferential movement. The friction rings or plates 50 are arranged within the annular chambers that are formed in the hub portions of the sprocket wheels and said rings are forced into frictional engagement with the hub portions of the sprocket wheels by plugs 51 that are seated in apertures 52, the latter being formed in the projecting portion 44 of hub 34. Arranged between each pair of plugs is an expansive coil spring 52ª. As a result of this construction, the degree of frictional contact between the plates or rings 50 and the hub portions of the sprocket wheels is equalized.

The width of each chamber 46 at the center is slightly greater than the diameter of the rollers 47, and as the width of the chamber 46 gradually decreases in both directions it will be seen that as a roller moves toward either end of the chamber 46 it will exert a wedging action between the corresponding sprocket wheel and the corresponding flat surface 45 of hub member 34.

The parts just described constitute a driving mechanism which equalizes the driving effort between the wheels of the traction unit, since it involves the difference of movement and travel between the two sides of the vehicle while negotiating curves, as well as the equalization of movement and action between the two wheels operating in tandem on each of the two sides.

The obtained effects of our improved structure, may be likened somewhat to a combination of three differentials, one primary or main, and a secondary on each side between the pair of wheels on said side.

The differential mechanism is used in the axle only while the structures on the two sides are strictly considered as equalizers, rather than differentials, inasmuch as they permit each wheel to revolve faster than its companion, when necessary, while said companion wheel continues to drive. When the occasion for such conditions is past and the speed of the over-running wheel passes to that of its companion, said over-running wheel immediately resumes its tractive efforts. Obviously this condition exists and the same action takes place in the companion wheel.

When the hub 34 rotates forwardly, the action is equivalent to revolving the sprocket rearwardly, and this drags the roller cage which is in frictional contact with the driven element or sprocket through the plates 50, wedging the rollers between the hub and sprocket thus transmitting the driving effort.

Obviously, any increase in the speed of the sprocket over that of the hub, will drag the rollers out of weighing contact until the lugs of the cage 48 strike the lugs of the adjacent cage. The cage is thus arrested in mid-position and the rollers will then float idly between the hub, sprocket and lugs, permitting the sprocket to over-run.

Reversal of the vehicle, or the use of the engine as a brake, is permitted by the concerted action of both sprockets, which throws both cages over to the other side.

In the gear driven form of tractor unit, illustrated in Figures 10 and 11, the equalizing mechanism, including the rollers, their cages and the friction rings or disks, is preferably arranged in the driving axle housing between said axle and housing 53 that are formed on a shaft 54 and sleeve 55, said shaft being arranged within said sleeve and the outer portions thereof extending into the trunnion 11. The ends of this shaft and sleeve within the trunnion are provided with miter gear wheels 56 that mesh with corresponding gear wheels 57, the latter being located on the inner ends of shafts 58 that extend in opposite directions through the members 19 that constitute the spring arm. The outer ends of the shafts 58 carry beveled pinions 59 that mesh with larger gears 60 that are secured to the stub axles upon which the traction wheels are mounted. In this construction, we prefer to arrange the spring seat so that the spring is disposed beneath the two part spring arm and each end of said spring is connected by a shackle 61 to the lower end of a short rod 62 that is arranged for sliding movement through a fixed bearing 63 on the end of the spring arm. The upper end of the rod 62 terminates in a head 64 and interposed between this head and the bearing 63 is a load carrying spring 65, and arranged beneath the bearing 63 and resting on a shoulder carried by the lower portion of rod 62 is a relatively short spring 66 that performs the functions of a rebound spring to absorb rebound shocks and the like.

In the modified construction illustrated in Figs. 12 and 13, we have illustrated a relatively simple form of mechanism for permitting differential movement between the driving sprockets 40.

In this construction, the inner faces of the hub portions 39 of the sprocket wheels are provided with face gear teeth 67 that are engaged by the teeth of pinions 68, the latter being journalled on pins 69 that are seated in the driving hub 70 or its equivalent.

This arrangement operates under the well known principles of a differential gearing and permits a certain degree of differential movement between the driving sprocket wheels 40.

Thus it will be seen that we have provided a four wheel traction unit that is relatively simple, strong and rugged in structure, said unit having simple and positively acting means associated with its driving mechanism for automatically equalizing the tractive effort between the four wheels, thereby minimizing tire wear and roadway surface deterioration, said unit being constructed so as to effect a material reduction in unsprung weight.

Obviously, minor changes in the size, form and construction of the various parts of our improved four wheel equalized traction unit may be made and substituted for those herein described without departing from the spirit of our invention, the scope of which is set forth in the appended claims.

We claim as our invention:

1. In a traction unit a main cross member, a pair of articulated side members, the parts of which are mounted to swing through vertical arcs having a common axis on said main cross member, wheels carried by both parts of each side member, means for imparting driving movement to said wheels, means forming a part of said driving connections whereby the wheels may operate independently of each other, and a spring mounted for rocking movement above each side member and arranged to resist upward swinging movement of the parts thereof.

2. In a traction unit a main cross member, a pair of articulated side members, the parts of which members are arranged to swing through vertical arcs having a common axis on said main cross member, a spring seat mounted to rotate about an axis coincident with the axis of the parts of the side member, and a spring carried by said spring seat for yieldingly resisting the upward swinging movement of the parts comprising said articulated side member.

3. In a traction unit, an articulated frame comprising a main cross member and two pairs of side members, that are pivoted on said main cross member, four wheels journaled on said frame and mounted for independent vertical and rotary movement, means for imparting driving movement to said wheels, and means forming a part of said driving means for permitting each wheel to rotate independently of the other wheels.

4. In a traction unit, a transverse member provided with trunnions near its ends, a pair of side members, each formed in two parts with the inner ends of said parts journaled on said trunnions, a spring mounted for rocking movement above each side member for yieldingly resisting the upward movement of the end portions of the parts of said side member, and traction wheels adjustably carried by the outer end portions of the parts of each side member.

5. In a traction unit, a transverse member provided with trunnions near its ends, a pair of side members, each formed in two parts with the inner ends of said parts journaled on said trunnions, a spring mounted for rocking movement above each side member for yieldingly resisting the upward movement of the end portions of the parts of said side member, traction wheels adjustably carried by the outer end portions of the parts of each side member, and means for imparting driving movement to said wheels.

6. In a traction unit, a transverse member provided with trunnions near its ends, a pair of side members, each formed in two parts with the inner ends of said parts journaled on said trunnions, a spring mounted for rocking movement above each side member for yieldingly resisting the upward movement of the end portions of the parts of said side member, traction wheels adjustably carried by the outer end portions of the parts of each side member, means for imparting driving movement to said wheels, and means associated with said driving means for permitting each wheel to operate independently of the other wheels.

7. In a four wheel equalized traction unit, a pair of articulated spring arms, each arm being formed in two parts and said parts being mounted for independent vertical swinging movement, a traction wheel journaled on each part of each arm, means for driving said wheels, automatically equalizing mechanism forming a part of said driving means for permitting any one wheel to rotate at a higher rate of speed than its companion wheel while traversing uneven surfaces of the roadway, a spring seat mounted for rocking movement adjacent to each spring arm, and a spring mounted on said seat and arranged to yieldingly resist upward swinging movement of the parts of said spring arm.

In testimony whereof we affix our signatures.

RICHARD L. OWEN.
ELMER H. BABEL.